US012701577B2

(12) United States Patent
Si et al.

(10) Patent No.: US 12,701,577 B2
(45) Date of Patent: Aug. 4, 2026

(54) METHODS AND APPARATUSES FOR TRIGGERING ADAPTATION FOR WIRELESS COMMUNICATION SYSTEM

(71) Applicant: Samsung Electronics Co., Ltd., Suwon-si (KR)

(72) Inventors: Hongbo Si, Plano, TX (US); Aristides Papasakellariou, Houston, TX (US); Qiongjie Lin, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 529 days.

(21) Appl. No.: 17/933,036

(22) Filed: Sep. 16, 2022

(65) Prior Publication Data

US 2023/0094063 A1 Mar. 30, 2023

Related U.S. Application Data

(60) Provisional application No. 63/249,999, filed on Sep. 29, 2021.

(51) Int. Cl.
| | |
|---|---|
| *H04W 72/23* | (2023.01) |
| *H04W 28/12* | (2009.01) |
| *H04W 72/04* | (2023.01) |

(52) U.S. Cl.
CPC ........... *H04W 72/23* (2023.01); *H04W 28/12* (2013.01)

(58) Field of Classification Search
CPC . H04W 28/00; H04W 28/02; H04W 28/0215; H04W 28/0221; H04W 28/10; H04W 28/12; H04W 52/00; H04W 52/02; H04W 52/0212; H04W 52/04; H04W 52/38; H04W 52/386; H04W 72/04; H04W 72/044; H04W 72/0446; H04W 72/20; H04W 72/23; H04W 72/231; H04W 72/232
See application file for complete search history.

(56) References Cited

U.S. PATENT DOCUMENTS

| | | | | |
|---|---|---|---|---|
| 9,345,017 | B2 * | 5/2016 | Park | H04W 76/11 |
| 10,687,319 | B2 * | 6/2020 | Babaei | H04W 52/58 |
| 10,863,494 | B2 * | 12/2020 | Zhang | H04W 72/23 |

(Continued)

OTHER PUBLICATIONS

"3rd Generation Partnership Project; Technical Specification Group Radio Access Network; NR; Physical channels and modulation (Release 16)", 3GPP TS 38.211 V16.6.0, Jun. 2021, 134 pages.

(Continued)

*Primary Examiner* — Quochien B Vuong

(57) ABSTRACT

Apparatuses and methods for triggering cell-specific or UE-group-specific adaptation. A method of a user equipment (UE) in a wireless communication system includes receiving, from a base station (BS), a set of higher layer parameters and determining a set of adaptation aspects based on the set of higher layer parameters. The method further includes determining a set of configurations for receiving a physical downlink control channel (PDCCH) and receiving the PDCCH based on the set of configurations. The PDCCH carries adaptation indicators including a set of code-points that corresponds values for the set of adaptation aspects, respectively. The method further includes applying the values for the set of adaptation aspects based on the set of code-points included in the adaptation indicators.

18 Claims, 9 Drawing Sheets

(56)                    References Cited

U.S. PATENT DOCUMENTS

| | | | | |
|---|---|---|---|---|
| 10,912,065 | B2 * | 2/2021 | Aiba ..................... | H04W 72/20 |
| 11,284,477 | B2 * | 3/2022 | Islam ................... | H04W 72/23 |
| 11,350,364 | B2 * | 5/2022 | Sun ....................... | H04W 72/23 |
| 11,490,334 | B2 * | 11/2022 | Zhou ................ | H04W 52/0229 |
| 2018/0041997 | A1 | 2/2018 | Babaei et al. | |
| 2021/0105739 | A1 | 4/2021 | Lin et al. | |
| 2021/0185609 | A1 | 6/2021 | Zhou et al. | |
| 2021/0298065 | A1 * | 9/2021 | Awoniyi-Oteri ........................... | |
| | | | | H04W 52/0216 |

OTHER PUBLICATIONS

"3rd Generation Partnership Project; Technical Specification Group Radio Access Network; NR; Multiplexing and channel coding (Release 16)", 3GPP TS 38.212 V16.6.0, Jun. 2021, 153 pages.

"3rd Generation Partnership Project; Technical Specification Group Radio Access Network; NR; Physical layer procedures for control (Release 16)", 3GPP TS 38.213 V16.6.0, Jun. 2021, 187 pages.

"3rd Generation Partnership Project; Technical Specification Group Radio Access Network; NR; Physical layer procedures for data (Release 16)", 3GPP TS 38.214 V16.6.0, Jun. 2021, 172 pages.

"5G; NR; Radio Resource Control (RRC); Protocol specification (3GPP TS 38.331 version 16.6.0 Release 16)", ETSI TS 138 331 V16.6.0, Oct. 2021, 948 pages.

"5G; NR; Medium Access Control (MAC) protocol specification (3GPP TS 38.321 version 16.6.0 Release 16)", ETSI TS 138 321 V16.6.0, Oct. 2021, 160 pages.

Extended European Search Report issued Dec. 6, 2024 regarding Application No. 22876806.5, 19 pages.

MCCTF160, "V2X: Test Model Updates", 3GPP TSG-RAN WG5 Meeting #77, R5-176134r1, Nov. 2017, 11 pages.

International Search Report and Written Opinion issued Dec. 27, 2022 regarding International Application No. PCT/KR2022/014465, 8 pages.

Ericsson, "Provisioning of TRS occasions to Idle/Inactive UEs", 3GPP TSG-RAN WG1 Meeting #106-e, R1-2107999, Aug. 2021, 12 pages.

TCL Communication, "TRS/CSI-RS occasions for IDLE/inactive mode", 3GPP TSGRAN WG1 Meeting #106-e, R1-2106519, Aug. 2021, 8 pages.

Sony, "Considerations on TRS/CSI-RS occasion(s) for idle/inactive UEs", 3GPP TSG-RAN WG1 Meeting #106-e, R1-2106816, Aug. 2021, 4 pages.

CATT, "Configuration of TRS/CSI-RS for paging enhancement", 3GPP TSG-RAN WG1 Meeting #106-e, R1-2106984, Aug. 2021, 11 pages.

* cited by examiner

600

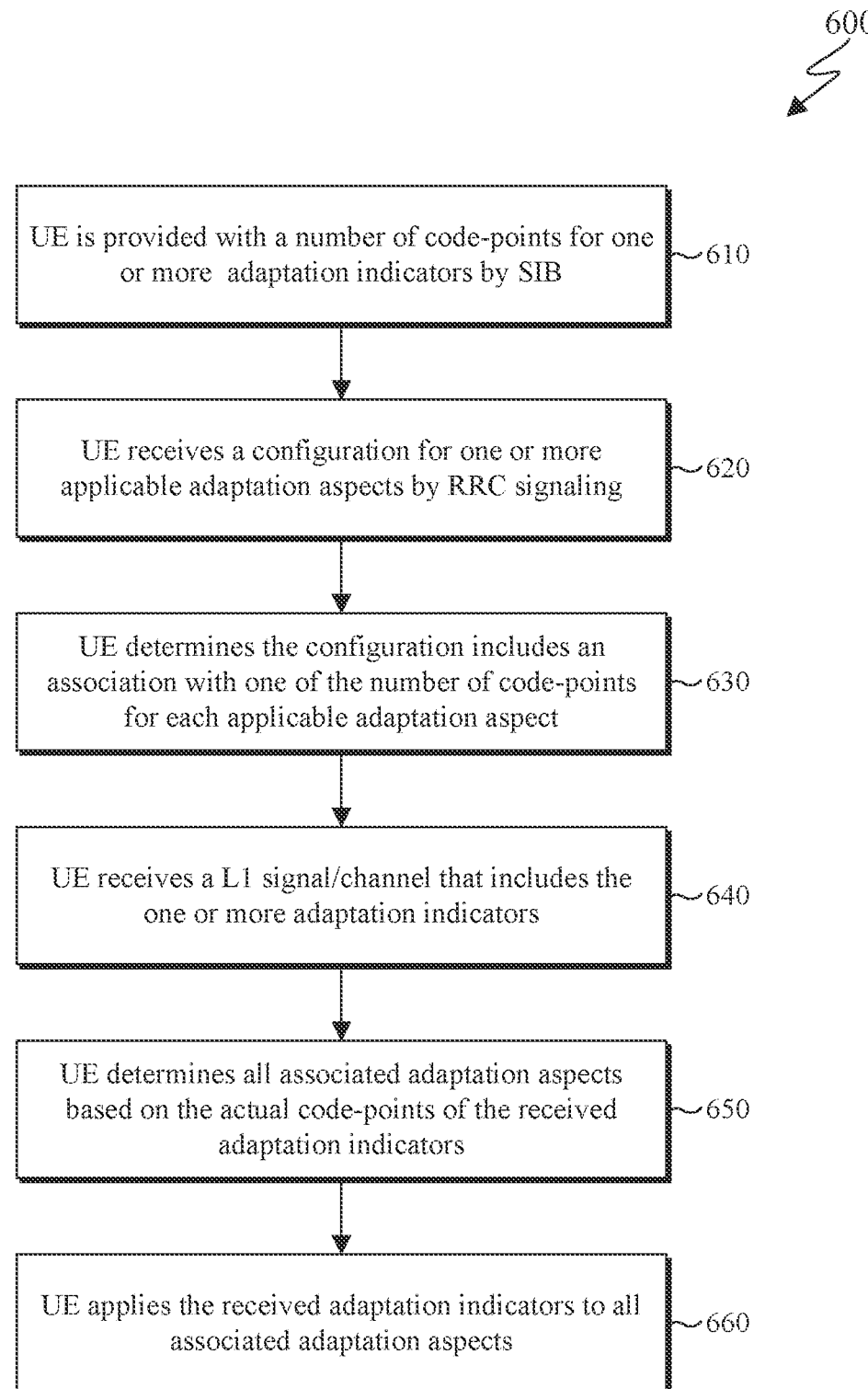

UE is provided with a number of code-points for one or more adaptation indicators by SIB ~610

UE receives a configuration for one or more applicable adaptation aspects by RRC signaling ~620

UE determines the configuration includes an association with one of the number of code-points for each applicable adaptation aspect ~630

UE receives a L1 signal/channel that includes the one or more adaptation indicators ~640

UE determines all associated adaptation aspects based on the actual code-points of the received adaptation indicators ~650

UE applies the received adaptation indicators to all associated adaptation aspects ~660

FIG. 6

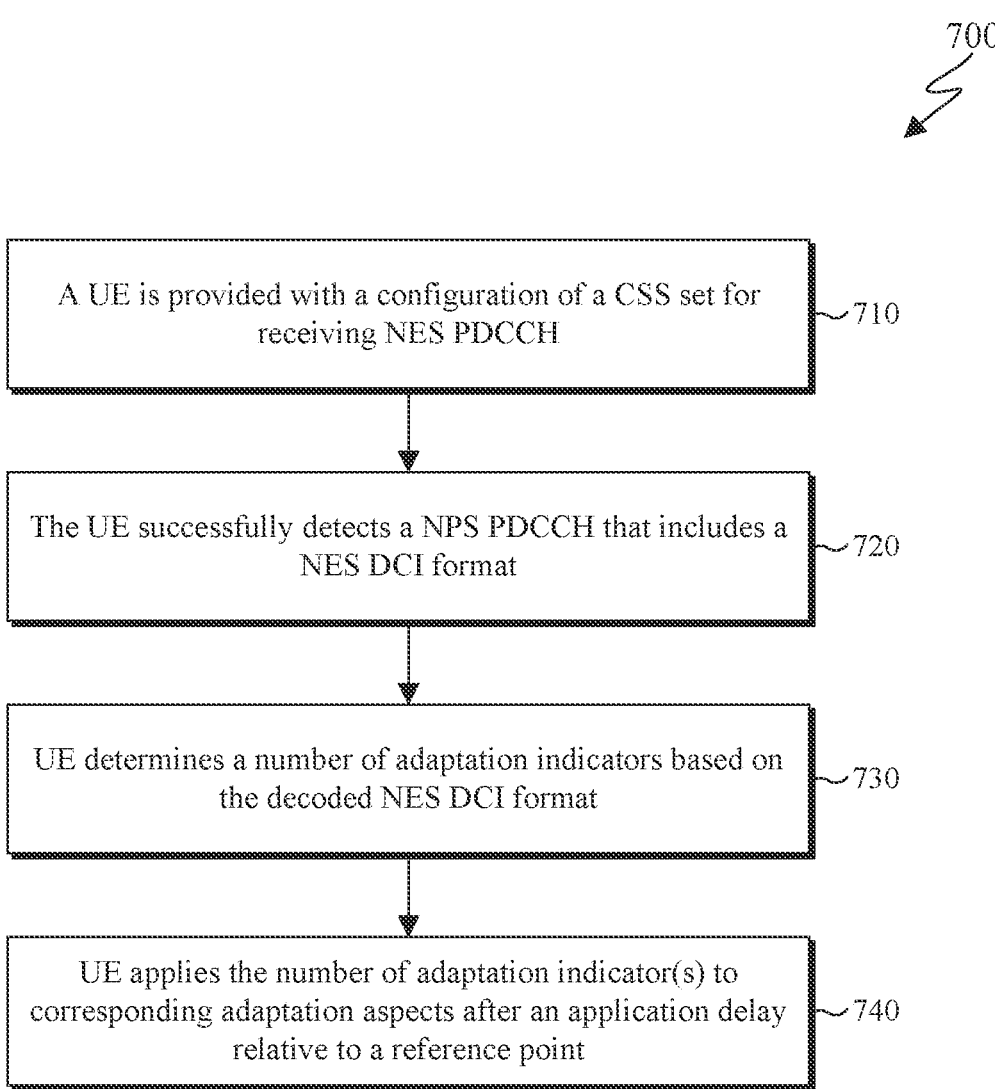

700

A UE is provided with a configuration of a CSS set for receiving NES PDCCH — 710

The UE successfully detects a NPS PDCCH that includes a NES DCI format — 720

UE determines a number of adaptation indicators based on the decoded NES DCI format — 730

UE applies the number of adaptation indicator(s) to corresponding adaptation aspects after an application delay relative to a reference point — 740

FIG. 7

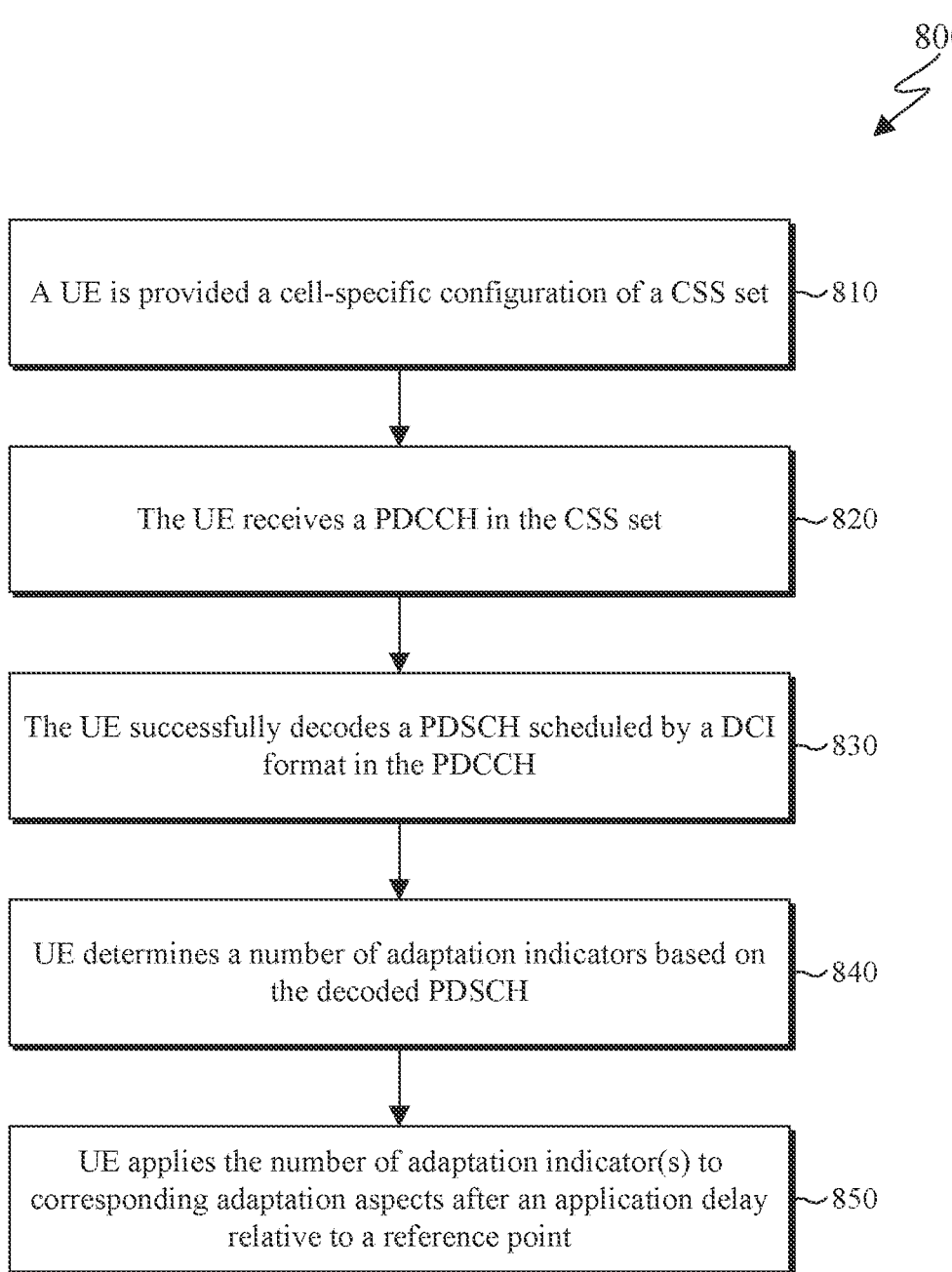

*800*

A UE is provided a cell-specific configuration of a CSS set   ~810

The UE receives a PDCCH in the CSS set   ~820

The UE successfully decodes a PDSCH scheduled by a DCI format in the PDCCH   ~830

UE determines a number of adaptation indicators based on the decoded PDSCH   ~840

UE applies the number of adaptation indicator(s) to corresponding adaptation aspects after an application delay relative to a reference point   ~850

FIG. 8

METHODS AND APPARATUSES FOR TRIGGERING ADAPTATION FOR WIRELESS COMMUNICATION SYSTEM

CROSS-REFERENCE TO RELATED APPLICATION AND CLAIM OF PRIORITY

This application claims priority under 35 U.S.C. § 119(e) to U.S. Provisional Patent Application No. 63/249,999 filed on Sep. 29, 2021. The above-identified provisional patent application is hereby incorporated by reference in its entirety.

TECHNICAL FIELD

The present disclosure relates generally to wireless communication systems and, more specifically, the present disclosure relates to apparatuses and methods for triggering cell-specific or UE-group-specific adaptation, for example, for network energy savings.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to triggering cell-specific or UE-group-specific adaptation.

In one embodiment, a base station (BS) in a wireless communication system is provided. The BS includes a processor configured to determine a set of adaptation aspects to be included in a set of higher layer parameters and determine a set of configurations for reception of a physical downlink control channel (PDCCH). The PDCCH carries adaptation indicators including a set of code-points that corresponds to values for the set of adaptation aspects, respectively. The BS further includes a transceiver operably coupled to the processor. The transceiver is configured to transmit, to a user equipment (UE), the set of higher layer parameters and transmit, to the UE, the PDCCH based on the set of configurations.

In another embodiment, a UE in a wireless communication system is provided. The UE includes a transceiver configured to receive, from a BS, a set of higher layer parameters and a processor operably coupled to the transceiver. The processor is configured to determine a set of adaptation aspects based on the set of higher layer parameters and determine a set of configurations for receiving a PDCCH. The transceiver is further configured to receive the PDCCH based on the set of configurations, wherein the PDCCH carries adaptation indicators including a set of code-points that corresponds values for the set of adaptation aspects, respectively. The processor is further configured to apply the values for the set of adaptation aspects based on the set of code-points included in the adaptation indicators.

In yet another embodiment, a method of a UE in a wireless communication system is provided. The method includes receiving, from a BS, a set of higher layer parameters and determining a set of adaptation aspects based on the set of higher layer parameters. The method further includes determining a set of configurations for receiving a PDCCH and receiving the PDCCH based on the set of configurations. The PDCCH carries adaptation indicators including a set of code-points that corresponds values for the set of adaptation aspects, respectively. The method further includes applying the values for the set of adaptation aspects based on the set of code-points included in the adaptation indicators.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates an example method for applying adaptation indicators according to embodiments of the present disclosure;

FIG. 7 illustrates an example method for obtaining transmission/reception adaptation indicators provided by downlink control information (DCI) format A in a physical downlink control channel (PDCCH) according to embodiments of the present disclosure;

FIG. 8 illustrates an example method for obtaining transmission/reception adaptation indicators based on a first approach for a network energy savings (NES) physical downlink shared channel (PDSCH) according to embodiments of the present disclosure;

DETAILED DESCRIPTION

Figure 1:
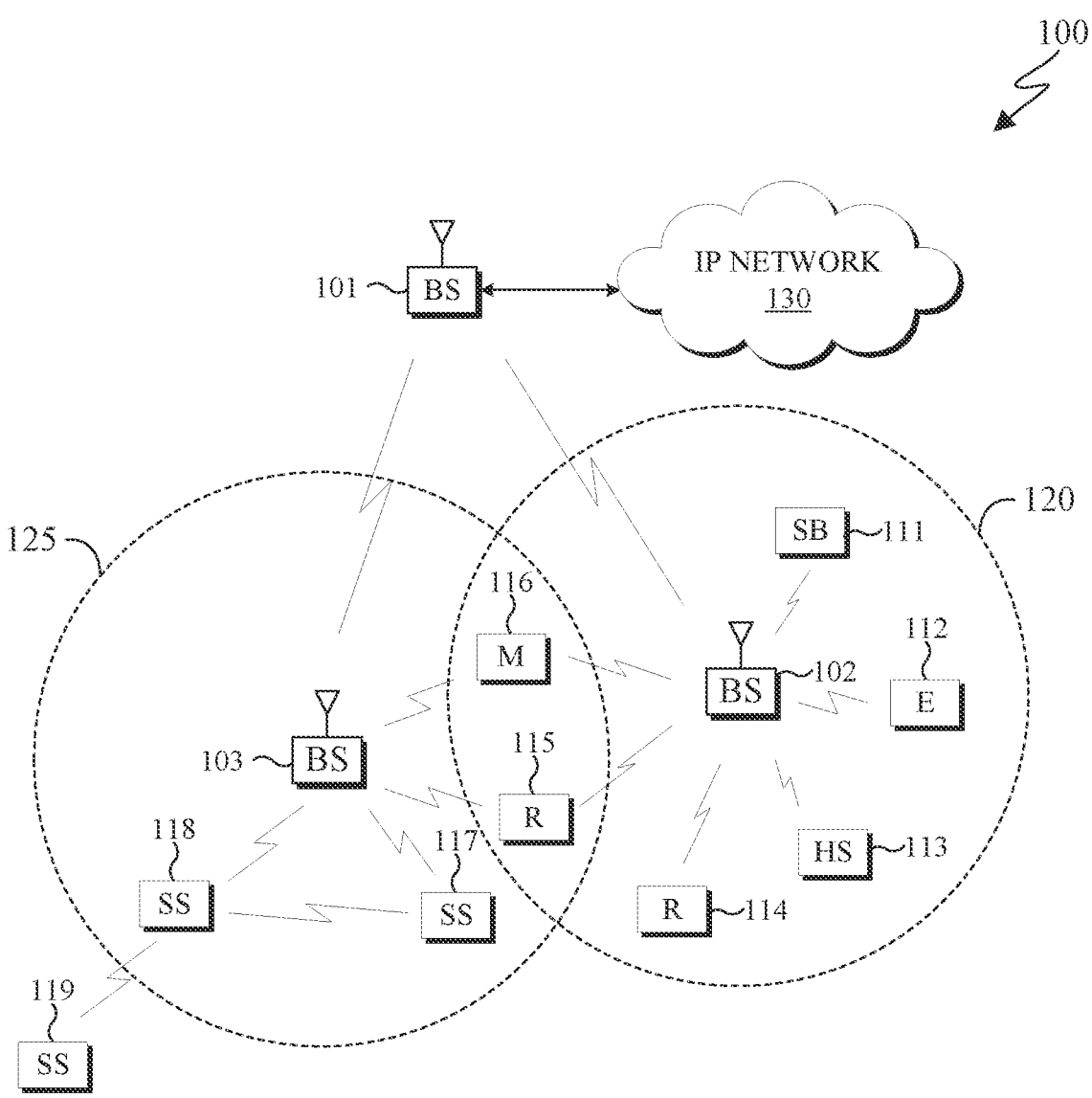
FIG. 1 illustrates an example wireless network according to embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.6.0, "NR; Physical channels and modulation" ("REF1"); 3GPP TS 38.212 v16.6.0, "NR; Multiplexing and channel coding" ("REF2"); 3GPP TS 38.213 v16.6.0, "NR; Physical layer procedures for control" ("REF3"); 3GPP TS 38.214 v16.6.0, "NR; Physical layer procedures for data" ("REF4"); 3GPP TS 38.331 v16.6.0, "NR; Radio Resource Control (RRC) protocol specification"

("REF5"); and 3GPP TS 38.321 v16.6.0, "NR; Medium Access Control (MAC) protocol specification" ("REF6").

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of the fourth generation (4G) communication systems, efforts have been made to develop and deploy an improved 5th generation (5G) or pre-5G/NR communication system. Therefore, the 5G or pre- 5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macro-cell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
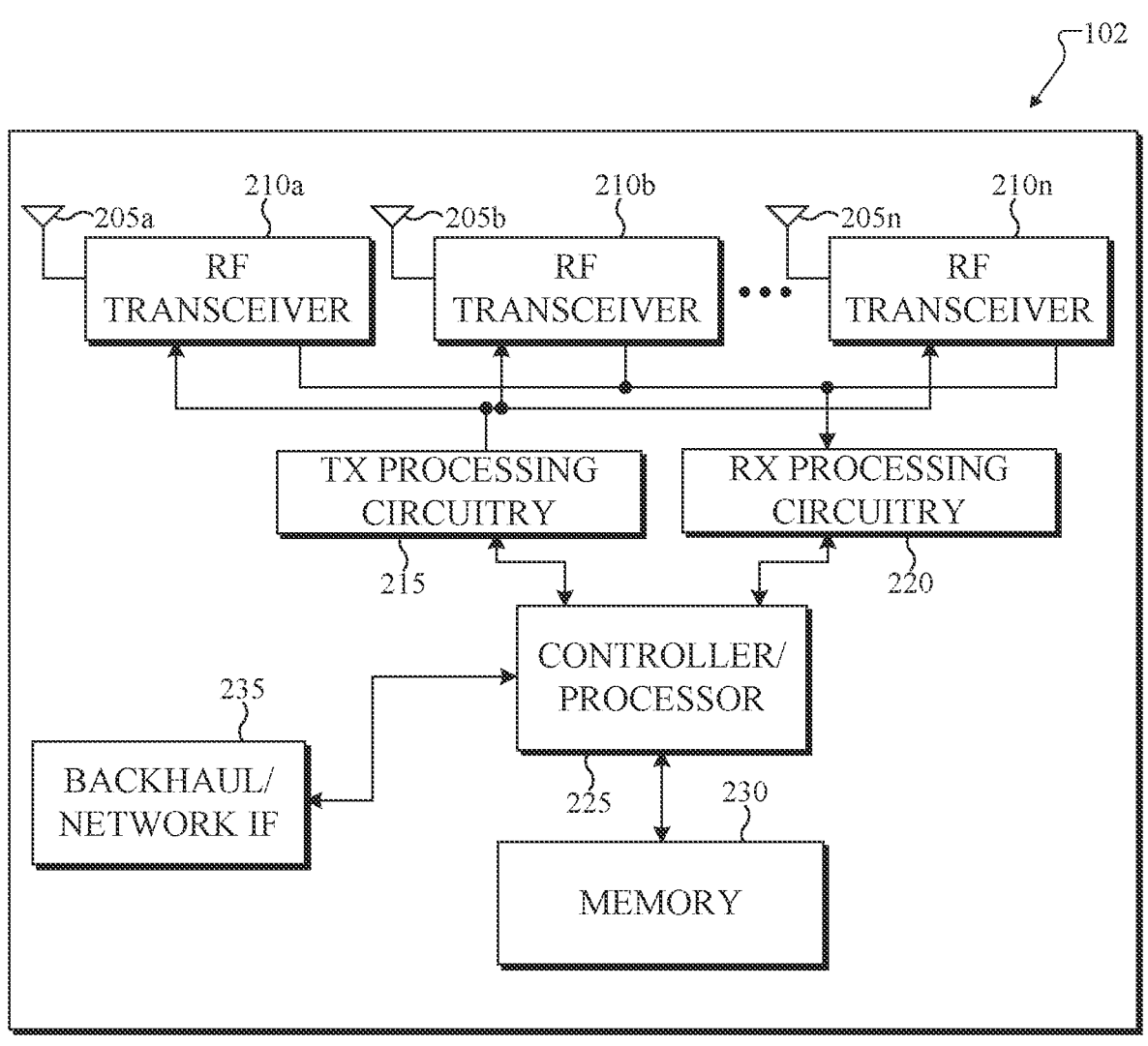
FIG. 2 illustrates an example base station (BS) according to embodiments of the present disclosure.
Figure 3:
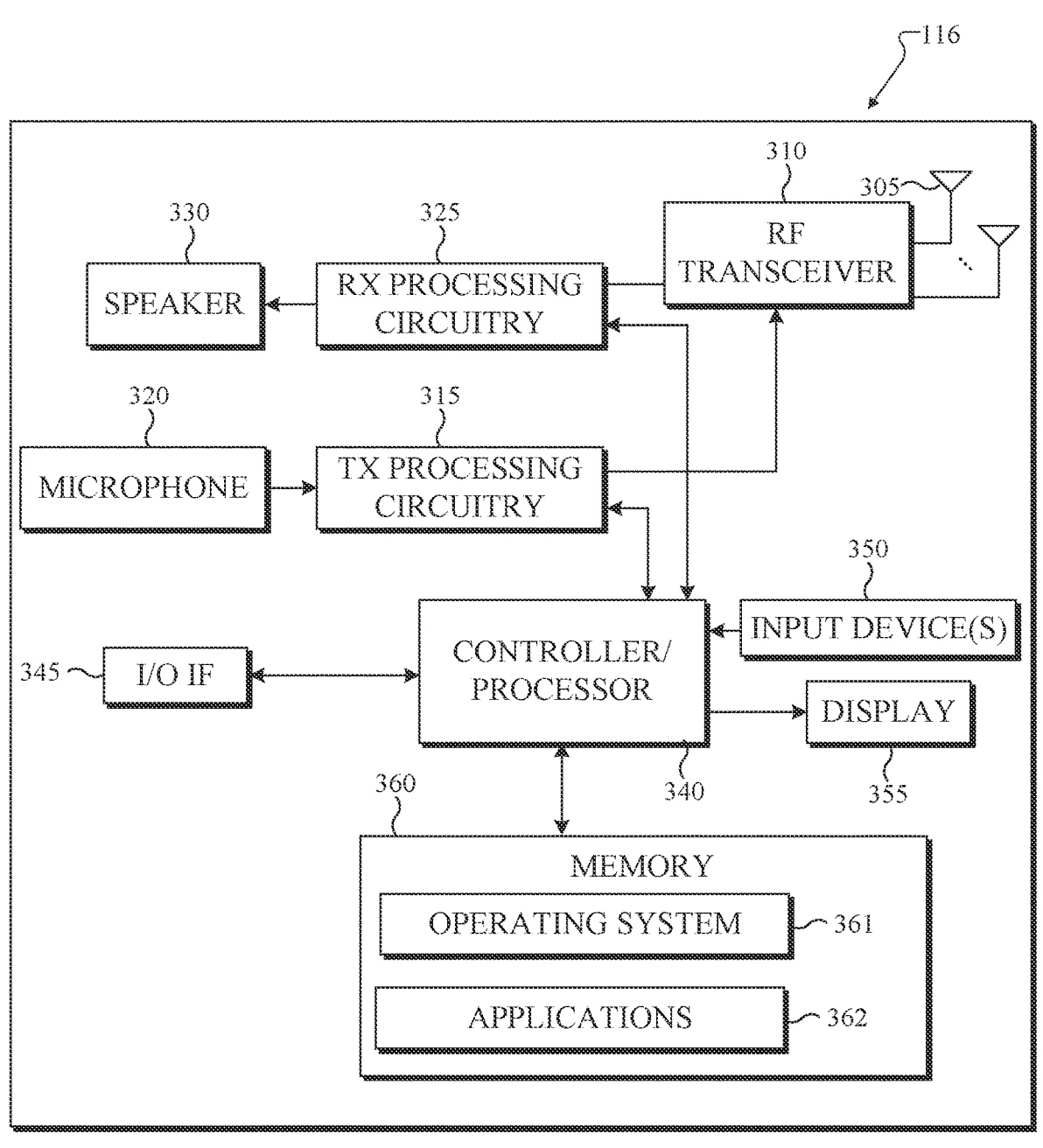
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, LTE, long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for triggering methods for cell-specific or UE-group-specific adaptation for network energy savings. In certain embodiments, and one or more of the BSs 101-103 includes circuitry, programing, or a combination thereof for triggering methods for cell-specific or UE-group-specific adaptation for network energy savings.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support triggering methods for cell-specific or UE-group-specific adaptation for network energy savings. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figures 4, 5:
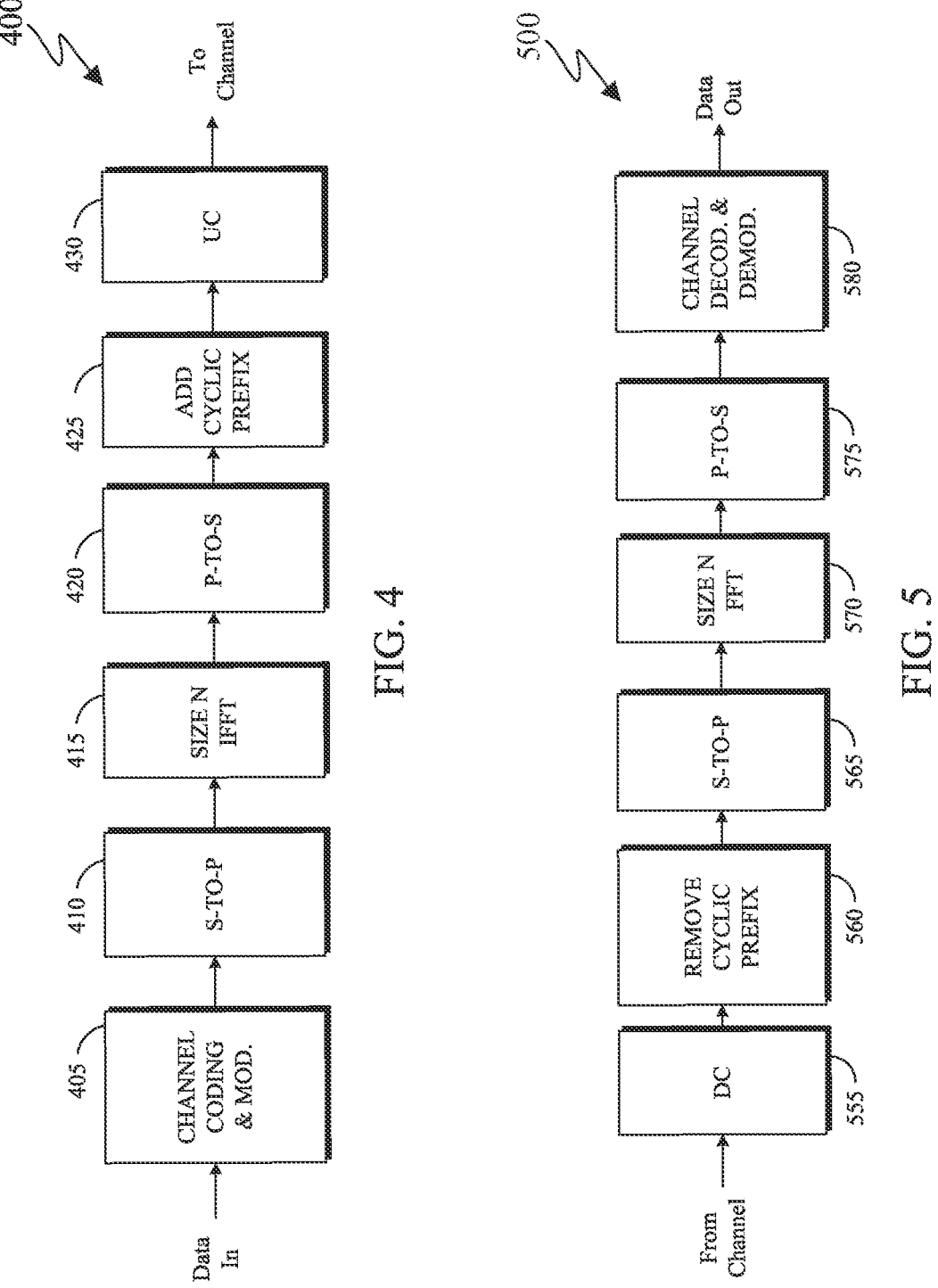
FIGS. 4 and 5 illustrate example wireless transmit and receive paths according to embodiments of the present disclosure.

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support triggering methods for cell-specific or UE-group-specific adaptation for network energy savings as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

With the increasing number of 5G/NR base stations deployed to support 5G wireless communications, the power consumption of 5G network has become a major concern to operators. The power consumption of a single NR based station is at least 3 times larger than LTE, as NR is deployed in higher frequency bands than LTE, and uses wider bandwidth and massive MIMO operation. In NR Rel-16/17, several UE power saving schemes have been introduced to reduce energy/power consumption for UEs. To maintain a sustainable 5G/NR deployment, it is necessary to consider efficient energy saving mechanisms from a network (NW) perspective.

Embodiments of the present disclosure take into consideration various issues related to network energy. For example, a first issue related to network energy savings is the efficiency of resource utilization in spatial domain by a gNB. Many 5G/NR network deployments would use a high carrier frequency (millimeter wave) and, due to a large corresponding path-loss, a signal needs to be transmitted within a beam with relatively narrow radiation angle. To cover UEs scattered in all directions, a 5G/NR NW supports multi-beam transmission/reception and multi-TRP transmission/reception based on massive antenna array per TRP. For a cell-specific or UE-group-specific signal/channel transmission dedicated to all UEs in a serving cell, such as a physical broadcast channel (PBCH), the serving cell repeats the transmission in a number of consecutive occasions, wherein each transmission is associated with a different beam direction. In order to transmit or receive UE-specific traffic at a high frequency band, a serving cell has to manage/update the ideal beam direction(s) between the serving cell and a connected UE. The beam management procedure requires the serving cell to transmit RS resources, such as synchronized signal (SS)/PBCH block (SSB) or channel state information (CSI)— reference signal (RS) (CSI-RS), and receive information for a preferred beam direction from the UE, for example as part of CSI. Once the NW receives information about preferred beam directions for a UE, the NW can schedule data transmission/reception to/from the UE through one beam or multiple beams from multiple TRPs. To reduce NW energy consumption related to multi-beam operation, a NW can reduce a number of active beams or TRPs. However, NR only supports reconfiguration/(de)activation of spatial resources, such as transmission configuration indication (TCI) states, through UE-specific higher layer signaling, e.g., RRC or MAC control element (CE), which is relatively slow and can result in large NW energy consumption. Therefore, it is beneficial to consider cell-specific or UE-group-specific adaptation of valid spatial resources using physical layer signaling for the purpose of NW energy savings.

A second issue related to network energy savings is an efficiency of gNB resource utilization in time/frequency domains. A 5G/NR NW supports carrier aggregation (CA) with up to 16 carrier components (CCs) for a connected UE, wherein a maximum bandwidth for a CC can be up to 400 MHz. The energy consumption would be very high for the NW to operate multiple CCs simultaneously. Even when there is no traffic in a CC, the NW has to consume a large amount of energy to main a link quality between the NW and UEs. For example, a NW has to transmit periodic RS resources for beam management or CSI measurement/reporting. Currently, a change in CA operation is based either on UE-specific RRC signaling for reconfiguration of secondary cells (SCells) for CA operation, or on a MAC CE for activation/deactivation of configured SCells, or on physical layer based UE-specific adaptation of a dormant/non-dormant state per SCell. However, UE-specific reconfiguration or adaptation results in large NW energy consumption as each UE needs to be separately addressed. Therefore, it is beneficial to consider cell-specific or UE-group-specific adaptation on gNB resources in the time/frequency domains, such as availability of a CC/cell or of periodic RS resources, through physical layer based signaling for the purpose of NW energy savings.

A third issue related to network energy savings is a large NW energy consumption for paging message transmission to idle/inactive UEs. A NW supports a UE-group specific paging mechanism where the NW configures a number of paging occasions (POs) per discontinuous reception (DRX) cycle and a UE is configured to monitor physical downlink control channel (PDCCH) in one PO per DRX cycle. There is a tradeoff between NW energy consumption and UE energy consumption regarding the configurations of the number of POs per DRX cycle. However, the reconfiguration of DRX for paging is done through a system information (SI) update procedure and can require large NW energy consumption. Therefore, it is beneficial to consider a cell-specific or UE-group-specific adaptation for paging configuration through physical layer signaling for the purpose of NW energy savings.

In addition, NR reuses the paging mechanism from LTE, where a NW has to transmit a paging message through all base stations within a paging NW. However, a UE typically only monitors paging occasion(s) from one base station, such as the base station having the largest reference signal received power (RSRP) in order for the UE to achieve best coverage. Consequently, a NW wastes energy to transmit paging messages through multiple base stations. The issue is more severe for a 5G/NR system compared to an LTE system when multi-beam transmission is needed for a network to cover UEs located in all directions. Therefore, it is beneficial to avoid unnecessary paging transmission through multiple gNBs/cells within a paging NW for NW energy savings. In order to achieve that objective, UE assistance information can be considered, such as whether or not a UE is still in the coverage of a serving cell, and mobility information in idle/inactive mode.

A fourth issue related to network energy savings is a large NW energy consumption for cell-specific or UE-group-specific indication to idle/inactive UEs based on paging mechanism. Currently, NR supports cell-specific or UE-group-specific indication to idle/inactive UEs, such as SI modification or Earthquake and Tsunami Warning System (ETWS) notification, or availability indication for available idle/inactive mode TRS resource, based on short message in paging PDCCH. However, paging PDCCH transmissions are repeated in multiple POs per UE group. Since the short message is common to all UEs in the serving cell, a NW wastes energy to repeat short messages in multiple POs across multiple beam directions. Therefore, it is beneficial to consider separate physical layer signaling for cell-specific or UE-group-specific indication and UE-group based paging to idle/inactive UEs for the purpose of NW energy savings.

A fifth issue related to network energy savings is a large NW energy consumption for transmitting on periodic RS resources for the purpose of radio resource management (RRM) measurements by UEs. Currently, NR supports semi-static configuration of a single SSB-based RRM Measurement Timing Configuration (SMTC) per frequency layer for RRM measurements in idle/inactive mode and two SMTC per frequency layer for RRM measurements in connected mode. The configuration to a UE for RRM measurements in idle/inactive mode is provided by a SIB, while the configuration for RRM measurements in connected mode is provided by UE-specific RRC signaling. However, there is a tradeoff between NW energy consumption and UE energy consumption regarding the configuration for RRM measurements, such as a periodicity of SMTC window, a list of cells, and a list of associated periodic RS resources. Therefore, NW energy saving can be achieved by considering cell-specific or UE-group-specific adaptation on available resources or configurations for RRM measurements.

Accordingly, embodiments of the present disclosure take into consideration that there is a need to determine signaling mechanisms and procedures for cell-specific or UE-group-specific adaptation of valid spatial resources using physical layer signaling for NW energy savings.

Embodiments of the present disclosure take into consideration that there is another need to determine signaling mechanisms and procedures for cell-specific or UE-group-specific adaptation of valid spatial resources using physical layer signaling for NW energy savings.

Embodiments of the present disclosure take into consideration that there is another need to determine signaling mechanisms and procedures for cell-specific or UE-group-specific adaptation on gNB resources in the time/frequency domains for NW energy savings.

Embodiments of the present disclosure take into consideration that there is another need to enable cell-specific or UE-group-specific adaptation for paging configuration through physical layer signaling for NW energy savings.

Embodiments of the present disclosure take into consideration that there is another need to define physical layer signaling for cell-specific or UE-group-specific indication and UE-group based paging to idle/inactive UEs for NW energy savings.

Embodiments of the present disclosure take into consideration that there is yet another need to provide cell-specific or UE-group-specific adaptation on available resources or configurations for RRM measurements for NW energy savings.

Accordingly, embodiments of the present disclosure describe mechanisms and procedures for cell-specific or UE-group-specific adaptation based on physical layer signaling for NW energy savings.

Certain embodiments of the present disclosure relate to a pre-5G or 5G communication system to be provided for supporting higher data rates Beyond 4th-Generation (4G) communication system such as LTE. The disclosure relates to determining applicable cell-specific or UE-group-specific adaptation aspect(s) for NW energy savings. This disclosure further relates to determining broadcast PDCCH based signaling method for cell-specific or UE-group-specific adaptation for NW energy saving. This disclosure also relates to determining broadcast physical downlink shared channel (PDSCH) based signaling method for cell-specific adaptation for NW energy saving. This disclosure finally related to determining a combination of broadcast PDCCH and PDSCH based signaling method for cell-specific or UE-group-specific adaptation for NW energy saving.

Aspects, features, and advantages of the present disclosure are readily apparent from the following detailed description, simply by illustrating a number of particular embodiments and implementations, including the best mode contemplated for carrying out the present disclosure. The present disclosure is also capable of other and different embodiments, and its several details can be modified in various obvious respects, all without departing from the spirit and scope of the present disclosure. Accordingly, the drawings and description are to be regarded as illustrative in nature, and not as restrictive. The present disclosure is illustrated by way of example, and not by way of limitation, in the figures of the accompanying drawings.

It is noted that an italicized name for a parameter implies that the parameter is provided by higher layers.

It is also noted that unless mentioned otherwise, higher layer signaling includes signaling in a SIB, a MAC CE, or UE-specific RRC signaling.

It is further noted that, a downlink control information (DCI) format providing adaptation indicators for NW power savings is assumed to have cyclic redundancy check (CRC) bits scrambled by a separate radio network temporary identifier (RNTI), referred to as network energy savings (NES)-RNTI (NES-RNTI). Similar, a Transport Block (TB) in a PDSCH providing adaptation indicators for NW power savings is assumed to have CRC bits scrambled by the NES-RNTI. In one example, the NES-RNTI can be the same as a C-RNTI, a SI-RNTI, a SFI-RNTI, a PEI-RNTI, a P-RNTI, a CS-RNTI, a MCS-C-RNTI, or a TC-RNTI.

Embodiments of the present disclosure describe aspects for cell-specific or UE-group specific adaptation for NW energy savings. This is described in the following examples and embodiments, such as those of FIG. 6.

FIG. 6 illustrates an example method 400 for applying adaptation indicators according to embodiments of the present disclosure. The steps of the method 600 of FIG. 6 can be performed by any of the UEs 111-116 of FIG. 1, such as the UE 116 of FIG. 3. The method 600 is for illustration only and other embodiments can be used without departing from the scope of the present disclosure.

Embodiments of the present disclosure considers applicable cell-specific, or UE-group specific, adaptation aspect(s) for NW energy savings. One or more cell-specific, or UE-group specific, adaptation indicator(s) can be provided by a serving cell in a physical signal/channel, such as a PDCCH or a PDSCH. The cell-specific, or the UE group specific, adaptation indicator can trigger adaptation on valid/available gNB/cell resources or capabilities. The following considers cell-specific or UE-group-specific adaptation indicator but the embodiment also directly applies to UE-group specific in case the adaptation indicator is applicable only to a group of UEs for the serving cell, such as UE with baseline capabilities, and is not applicable to other groups of UEs for the serving cell, such as UE having reduced capabilities, that may not receive or may ignore the adaptation indicator.

The cell-specific, or UE-group specific adaptation indicator can indicate a number of code-points, wherein the number of code-points are either defined in the specifications of the system operation, or are provided to a UE by higher layers, e.g., in SIB or in UE specific RRC signaling. In one example, a code-point is a bit that indicates whether or not an associated adaptation aspect is valid/available. In another example, a code-point is a group index associated with a number of resources from an associated adaptation aspect, such as a SSB index, a TCI states group ID, a search space set group ID, or a CSI-RS resources group ID, wherein the code-point indicates the availability of the resources associated with the group index.

For an applicable adaptation aspect, wherein a configuration of the applicable aspect is provided to the UE by RRC signaling, the configuration can include an association to at least one code-point from the number of code-points. When a UE receives an adaptation indicator for the applicable adaptation aspect, the UE determines an indicated code-point based on the value of the adaptation indicator. The UE then determines whether or not the UE has an applicable adaptation aspect associated with the indicated code-point and, when the UE does, the UE applies the indication of the code-point to each associated applicable adaptation aspect.

For an applicable adaptation aspect, wherein a configuration of the applicable aspect is provided to a UE by a SIB or by UE-specific RRC signaling, the applicable adaptation aspect may be used in a number of physical layer signal/channel transmissions/receptions. When a UE receives an adaptation indicator for the applicable adaptation aspect, the UE can assume the adaptation indicator overwrites or replaces the configuration of the applicable adaptation aspect in some or all of the number of physical layer signal/channel transmissions/receptions.

Embodiments of the present disclosure describe types of adaptation aspect that can be triggered by an adaptation indicator.

In a first type of adaptation aspect triggered by an adaptation indicator, the adaptation indicator can provide valid spatial parameter(s) for transmission or reception in active downlink (DL)/uplink (UL) bandwidth part (BWP) in a serving cell. A spatial parameter can be any of the following options, or any combination of the following options, and the adaptation aspect includes a number of the spatial parameters and details of the spatial parameter as described in the following options.

In a first option, the spatial parameter can be quasi co-location (QCL) information associated with a SSB (e.g., from a periodic SSB burst) in the serving cell, wherein a cell ID of the serving cell is provided at least by the SSS/PSS of the SSB. For a UE provided with QCL information associated with a SSB (e.g., from the periodic SSB burst) by higher layers, the UE determines whether or not the QCL information associated with a SSB is valid based on the cell-specific or UE-group-specific adaptation indicator. The UE can be provided with transmitted SSBs for a SSB burst from a serving cell, i.e., ssb-PositionsInBurst, by higher layers. In one method to apply the adaptation indicator, the UE can assume the adaptation indicator overwrites or replaces the ssb-PositionsInBurst in some or all the physical layer signal/channel transmissions/receptions where the ssb-PositionsInBurst is used. Examples of the physical layer signal/channel transmissions/receptions can be SSB-to-RO mapping, SSB-to-PDCCH for paging/other system information (OSI), or scrambling for PBCH, and so on as described in REF3 and REF4. In another method to apply an adaptation indicator, the UE does not expect to receive an SSB with an invalid QCL information or any DL signal/channel that has same QCL assumption as the SSB with the invalid QCL information. In yet another method to apply an adaptation indicator, the UE does not expect to perform measurement over an SSB with an invalid QCL information. In yet another method to apply an adaptation indicator, the UE does not expect to transmit any UL signal/channel that has association with the SSB with the invalid QCL information.

In a second option, the spatial parameter can be QCL information that is associated with a TCI state, wherein the TCI state includes at least a QCL reference signal configured in the serving cell. For a UE provided with QCL information associated with a TCI state by higher layers, wherein the configuration of the TCI state can be associated with one of the code-points of the adaptation indicator, the UE determines whether or not the TCI state is valid based on the adaptation indicator. The UE does not expect to receive any DL signal/channel, such as a CSI-RS, PDCCH, or PDSCH that is associated with an invalid TCI state as a network may deactivate a corresponding transmission point.

In a third option, the spatial parameter can be spatial relation information for UL signal/channel, such as physical uplink control channel (PUCCH), for example as provided by PUCCH-SpatialRelationInfo described in REF3 and in REF5, for PUCCH transmission in the serving cell. For a UE provided with spatial relation information for PUCCH transmission that is provided by higher layers, wherein the configuration of the spatial relation information can be associated with one of the code-points of the adaptation indicator, the UE determines whether or not the spatial relation information for PUCCH is valid based on the cell-specific or UE-group-specific adaptation indicator. The UE does not expect to transmit PUCCH associated with invalid spatial relation information as a network may deactivate a corresponding reception point.

In a fourth option, the spatial parameter can be spatial relation information associated with a UL signal/channel, such as sounding reference signal (SRS), where the spatial relation information can be a spatial relation between a reference RS and the SRS, such as by SRS-SpatialRelationInfo or SRS-SpatialRelationInfoPos-r16 as described in REF4 and in REF5. For a UE provided with spatial relation information associated with a SRS by higher layers, wherein the configuration of the spatial relation information can be associated with one of the code-points of the adaptation indicator, the UE does not expect to transmit SRS associated with invalid spatial relation information as a network may deactivate a corresponding reception point.

It is noted that the above functionalities are also applicable in the reverse when the adaptation indicator provides an indication through a code-point that a corresponding adaptation aspect is valid, for example when a network re-activates a set of antenna ports, or a TRP, or a cell.

In a second type of adaptation aspect triggered by an adaptation indicator, the adaptation indicator can directly indicate valid or invalid TRPs for transmission or reception in an active DL/UL BWP of a serving cell. Then, the UE (such as the UE 116) adjusts accordingly all transmissions/receptions having a spatial relation with a TCI state of an indicated TRP. The TRP can be indicated by an associated value of a CORESETPoolIndex for CORESETs provided by RRC signaling for an active DL BWP of the serving cell where PDCCH transmissions occur from the TRPs. For CORESETs not associated with a CORESETPoolIndex value by RRC signaling, the CORESETPoolIndex value is zero. For a UE provided with a value of CORESETPoolIndex for a CORESET, wherein the value based on RRC signaling can be associated with at least one code-point from the number of code-points of the adaptation indicator, the UE determines whether or not the CORESETPoolIndex value, or the associated TCI states, is valid based on the adaptation indicator. The UE does not expect to receive PDCCH in a CORESET associated with an invalid CORESETPoolIndex value, or to receive PDSCH, such as a semi-persistently scheduled (SPS) PDSCH, with a same QCL assumption/spatial relation as the TCI state in a CORESET associated with an invalid CORESETPoolIndex value, and the UE can stop monitoring PDCCH according to search space sets that are associated with a CORESET having an invalid CORESETPoolIndex value. In such manner, a NW can activate or deactivate a TRP using the adaptation indicator.

In a third type of adaptation aspect triggered by an adaptation indicator, the adaptation indicator can indicate available/valid (or unavailable/invalid) time/frequency domain resources for transmission or reception in an active DL/UL BWP in a serving cell. The time/frequency domain resources can be any of the following options, or any combination of the following options.

For a first option, the time/frequency domain resources can be a sleep duration for the serving cell (such as the BS 102). For a UE (such as the UE 116) provided with a configuration for a serving cell by higher layers, the UE determines the serving cell is not (or almost not) accessible/available for any transmission or reception during the indicated sleep duration. During the indicated sleep duration, the UE can switch to RRC_IDLE/INACTIVE state while keeping the RRC configuration or part of the RRC configuration of the serving cell. The UE may only expect to monitor a search space set for paging (e.g., Type2-PDCCH search space set) or SSBs in initial DL BWP of the serving cell during the indicated sleep duration. Alternatively, the UE can switch to another cell for continued data reception or transmission in RRC_CONNECTED state. The other cell can be either provided by higher layers in advance or provided together with the adaptation indicator by a same L1 signal/channel. When the indicated sleep duration expires, the UE can switch back to RRC_CONNECTED state in the serving cell, e.g., based on the stored RRC configuration or a RRC reconnection.

For a second option, the time/frequency domain resources can be a dormant duration for the serving cell (such as the BS 102). For a UE (such as the UE 116) provided with a configuration of a serving cell by higher layers, the UE determines the serving cell is not accessible/available for physical uplink shared channel (PUSCH) transmission or PDSCH reception during the indicated dormant duration in the serving cell. For example, the UE can stop monitoring PDCCH in UE-specific search space (USS) sets or Type3 PDCCH common search space (CSS) sets during the indicated dormant duration. For example, the UE can stop SPS PDSCH receptions or configured-grant (CG) PUSCH transmissions during the indicated dormant duration. When the indicated dormant duration expires, the UE can switch back to regular transmission or reception in the serving cell.

For a third option, the time/frequency domain resources can be available RS resources for CSI measurements from the serving cell (such as the BS 102). For a UE (such as the UE 116) configured with periodic RS resources for CSI measurements, such as a SSB or a CSI-RS resource by higher layers, the UE determines an availability of the RS resources based on the adaptation indicator. The availability can be any configuration parameter, such as periodicity or ID(s) of available RS resource(s) or resources set(s).

For a fourth option, the time/frequency domain resources can be available search space sets from the serving cell (such as the BS 102). For a UE (such as the UE 116) configured by higher layers a number of search space set(s), for example a number of CSS sets or USS sets, the UE determines an availability of the search space sets based on the adaptation indicator. For an applicable search space set provided to a UE by RRC signaling, the applicable search space set can be configured to be associated with at least one code-point of an adaptation indicator. When the UE receives the adaptation indicator, and the UE determines an indicated code-point, the UE then determines whether or not the UE has applicable search space sets associated with the indicated code-point. The UE determines whether or not the associated search space sets are available based on the definition/mapping of the code-point. In one example, a code-point or the value of the adaptation indicator can indicate a search space set group index and a configuration of an applicable search space set provided to UE includes an association/mapping to a search space set group index, wherein the UE assumes an applicable search space set is available if the associated search space set group index is same as the indicated search space set group index; otherwise, the UE assumes the applicable search space set is not available. The UE monitors PDCCH candidates in available search space sets and skips PDCCH monitoring in search space sets that are not available.

For a fifth option, the time/frequency domain resources can be valid BW of active DL/UL BWP of the serving cell (such as the BS 102). For example, an active DL/UL BWP can be an initial DL BWP. For a UE (such as the UE 116) configured with a DL/UL BWP in the serving cell by higher layers, the UE determines the valid BW of the DL/UL BWP based on the indicated BW from the cell-specific or UE-group-specific adaptation indicator. The UE expects to receive/transmit physical layer signals/channels only within the valid BW. For example, the UE assumes the indicated BW overwrites the configured BW of the active DL/UL BWP of the serving cell.

For a sixth option, the time/frequency domain resources can be active DL/UL BWP of the serving cell (such as the BS 102). For each DL/UL BWP configured to the UE by higher layer, the configuration of the DL/UL BWP can include an association with at least one code-point of an adaptation indicator. When the UE receives the adaptation indicator, the UE determines an associated DL/UL BWP based on the value of the adaptation indicator. The UE then switches to the associated DL/UL BWP as active DL/UL BWP for data reception/transmission.

In a fourth type of adaptation aspect triggered by a cell-specific or UE-group-specific adaptation indicator, the cell-specific or UE-group-specific adaptation indicator can indicate applicable value for one or more configuration parameters for paging. The configuration parameter for paging can be any of the following options, or any combination of the following options.

For a first option, the configuration parameter for paging can be a periodicity of a search space set configured for reception of PDCCH candidates for detection of a DCI format with CRC bits scrambled by a paging-RNTI (P-RNTI).

For a second option, the configuration parameter for paging can be a DRX cycle for paging.

For a third option, the configuration parameter for paging can be a number of paging frames per DRX cycle.

For a fourth option, the configuration parameter for paging can be a number of paging occasions per paging frame.

When a UE receives the cell-specific or UE-group-specific adaptation indicator, the UE can assume the applicable value provided by the cell-specific or UE-group-specific adaptation indicator overwrites or replaces the value configured by higher layer. A UE that is provided a configuration for paging by higher layers assumes that any of the indicated configuration parameters from the adaptation indicator overwrites corresponding configuration parameters provided by higher layers.

In a fifth type of adaptation aspect triggered by an adaptation indicator, the adaptation indicator can indicate any short message that can be provided via a DCI format with CRC scrambled by a P-RNTI. The short message can be any of the following options, or any combination of the following options.

For a first option, the short message can be SystemInfoModification as described in REF2 and REF5 that indicates whether or not there is system information modification.

For a second option, the short message can be etwsAndCmasIndication as described in REF2 and REF5 that indicates whether or not there is an ETWS primary notification and/or an ETWS secondary notification and/or a commercial mobile alert service (CMAS) notification.

For a third option, the short message can be availability indication of TRS/CSI-RS resources for idle/inactive UEs.

In a sixth type of adaptation aspect triggered by a cell-specific or UE-group-specific adaptation indicator, the cell-specific or UE-group-specific adaptation indicator can indicate available resources or configuration parameters for RRM measurements. The valid resources or configuration parameters for RRM measurements can be any of the following or any combination of the following: (i) Valid frequency layer(s) for SMTC, (ii) Valid list of cells, (iii) Valid BW for RS resources within a SMTC window, (iv) Valid RS resources or resources sets, (v) Periodicity for a SMTC, (vi) Offset for a SMTC, (vii) Duration for a SMTC, or (viii) SSB index(es) to measure for a SMTC.

A UE that is provided a configuration for RRM measurements by higher layers assumes that any of the indicated configuration parameters from the adaptation indicator overwrites corresponding configuration parameters provided by the higher layers. The UE determines an availability of RS resources for RRM measurements based on the adaptation indicator.

In a seventh type of adaptation aspect triggered by an adaptation indicator, the adaptation indicator can indicate a capability (e.g., of a cell or of UE(s)). The capability can be any of the following options or any combination of the following options.

For a first option, the capability can be based on a maximum number of SSBs per SSB burst.

For a second option, the capability can be based on a maximum number of TCI states for PDCCH/PDSCH.

For a third option, the capability can be based on a maximum number of spatial relations for PUCCH or SRS.

For a fourth option, the capability can be based on a maximum number of TRPs.

For a fifth option, the capability can be based on a maximum value of rank.

For a sixth option, the capability can be based on a maximum number of antenna ports.

For a seventh option, the capability can be based on a maximum number of CCs for CA operation.

For an eighth option, the capability can be based on a maximum number of UE-specific search space sets.

For a ninth option, the capability can be based on a maximum BW in terms of number of resource blocks (RBs) for the cell or an active DL/UL BWP in the cell.

For a tenth option, the capability can be based on a one or more PDCCH monitoring capabilities. A PDCCH monitoring capability is described REF5 and can be a slot-based PDCCH monitoring capability as provided by r15monitoringcapability, a span-based PDCCH monitoring capability as provided by r16monitoringcapability, or a multi-slot based PDCCH monitoring capability as provided by r17monitoringcapability.

For an eleventh option, the capability can be based on a maximum TX power/Class.

For a twelfth option, the capability can be based on UE types. A UE type can be defined in the specification of the system operation to be associated with a number of UE features. A capability can indicate a number of UE types and corresponding UE features a cell can support.

More than one capabilities can be predetermined, for example defined by the specifications of the system operation or indicated by higher layers. A UE expects to receive at least one capability, before establishing an RRC connection with the cell. Alternatively, a UE can perform cell reselection after receiving an adaptation on the capability of current serving cell. A UE does not expect to access the cell if the capability is not consistent with a UE capability.

When a UE (such as the UE 116) is configured with a number of N>1 serving cells, the UE can be configured to receive N>1 adaptation indicators in a physical signal/channel, wherein the n-th (n=1, . . . , N) indicator is for adaptation associated with n-th serving cell.

The method 600 as illustrated in FIG. 6 describes an example of UE procedure for applying adaptation indicators.

In step 610, a UE (such as the UE 116) is provided a number of code-points for one or more adaptation indicators, for example by SIB. The one or more adaptation indicators can be for one or more serving cells. In step 620, the UE receives a configuration for one or more applicable adaptation aspects by RRC signaling. For each applicable adaptation aspect, the UE determines the configuration includes an association with at least one of the number of code-points (step 630). In step 640, the UE receives a L1 signal/channel that includes the one or more adaptation indicators. In step 650, the UE determines all associated adaptation aspects based on the actual code-points of the received adaptation indicators. In step 660, the UE applies the adaptation indicators to all associated adaptation aspects.

Although FIG. 6 illustrates the method 600 various changes may be made to FIG. 6. For example, while the method 600 is shown as a series of steps, various steps could overlap, occur in parallel, occur in a different order, or occur multiple times. In another example, steps may be omitted or replaced by other steps. For example, steps of the method 600 can be executed in a different order.

Embodiments of the present disclosure also describe PDCCH based signaling methods. This is described in the following examples and embodiments, such as those of FIG. 7.

FIG. 7 illustrates an example method 700 for obtaining transmission/reception adaptation indicators provided by DCI format A in a PDCCH according to embodiments of the present disclosure. The steps of the method 700 of FIG. 7 can be performed by any of the UEs 111-116 of FIG. 1, such as the UE 116 of FIG. 3. The method 700 is for illustration only and other embodiments can be used without departing from the scope of the present disclosure.

Embodiments of the present disclosure also consider an adaptation for NW energy savings based on indications by a DCI format (e.g., the adaptation indicator is a DCI format), referred to as DCI format A, wherein a number of adaptation indicators are included in the DCI format A that is provided by a PDCCH. An adaptation indicator can be used to trigger any adaptation aspect as defined above.

For determining the DCI format A, any of the following information can be provided to a UE.

For a first example, payload size can be used for determining the DCI format A. For instance, the payload size of the DCI format A can be same as for a DCI format 1_0 provided by a PDCCH that the UE monitors according to a CSS set. In another example, the payload size of the DCI format A can be fixed, for example to 40 bits including CRC bits.

For a second example, RNTI can be used for determining the DCI format A. For instance, the RNTI of the DCI format A can be fixed and defined in the specifications of the system operation. In another example, the RNTI can be configured by higher layers. In another example, the RNTI can be determined based on a cell ID of the serving cell or a group ID of UEs where the UE is configured to monitor PDCCH for detection of the DCI format A.

For a third example, DCI fields for a number of cell-specific or UE-group-specific adaptation indicators, including content and order of the number of cell-specific or UE-group-specific adaptation indicator(s), can be used for determining the DCI format A.

For a fourth example, periodicity, $T_{NES\_DCI}$, for the UE to determine the PDCCH reception occasion that includes the DCI format, for example in a USS set can be used for determining the DCI format A.

For a fifth example, an offset, $O_{NES\_DCI}$, for the UE to determine the start of PDCCH reception occasion for the DCI format within a period, for example in a USS set can be used for determining the DCI format A.

For a fifth example, a search space set associated with the DCI format, at least when the size of the DCI format is different than a size of DCI format 1_0 for a CSS set, can be used for determining the DCI format A.

For a sixth example, a scrambling ID used for a demodulation reference signal (DM-RS) of the PDCCH that includes DCI format A or for the PDCCH for determining the DCI format A. The scrambling ID can be the RNTI used for decoding the DCI format A.

In certain embodiments, the information of the DCI format A can be provided to UE either by higher layers or be defined in the specifications of the system operation. For example, any of the information can be configured as a common parameter of a serving cell, which is "cell-specific" and the network ensures the necessary alignment with corresponding parameters of other UEs. For another example, any of the information can be configured as a common parameter for a group of UEs in a serving cell, which is "UE-group-specific" and the network ensures the necessary alignment with corresponding parameters of other UEs.

In certain embodiments, the UE can transmit a PUCCH to provide hybrid automatic repeat request (HARQ) acknowledgement (ACK) (HARQ-ACK) information in response to the PDCCH reception that includes the DCI format A, e.g., for each PDCCH reception period. The PUCCH format can be a PUCCH format 0 or a PUCCH format 1 as described in REF1. At least one of the following examples of UE behaviors for PUCCH transmission can be considered.

In a first example, the UE transmits the PUCCH only when the UE detects the DCI format A within a PDCCH reception period. The PUCCH transmission is in a PUCCH resource that is provided in advance to the UE by higher layers and indicates an ACK value.

In a second example, the UE transmits the PUCCH only when the UE does not detect (correctly decode) any DCI format A at PDCCH monitoring occasions for detection of DCI format A, for example as determined by a corresponding search space set or, in case the search space is not unique to DCI format A, as determined by a separate configuration provided by higher layers such as a bitmap mapping to a set of PDCCH MOs and having a periodic applicability based on the set of slots. The PUCCH transmission is in a PUCCH resource that is provided in advance to the UE by higher layers and indicates a negative acknowledgement (NACK) value.

In a third example, the approaches of the first and second examples can be combined wherein the PUCCH resource, as defined in REF3, for a PUCCH transmission indicating an ACK value is different than the PUCCH resource for a PUCCH transmission indicating NACK value.

It is also possible that the UE does not transmit a PUCCH regardless of whether or not the UE correctly decodes the DCI format A.

For determining PUCCH transmission occasion (TO) for HARQ-ACK information associated with a detection outcome for DCI format A in a serving cell, the UE can be provided any of the following information.

For example, the UE can be provided with a number of $N_{Tos} \geq 1$ PUCCH TO(s). When $N_{Tos} > 1$, each of the $N_{Tos}$ PUCCH TOs can be associated with one a spatial relation. For example, $N_{Tos}$ can be equal to the number of transmitted SSBs per SSB burst in the serving cell, and there is one to one mapping between a PUCCH TO and a transmitted SSB regarding QCL assumption/spatial relation. A UE can transmit PUCCH in a TO associated with a SSB index that the UE identified during initial access.

For another example, the UE can be provided with a time offset, $k_{1,DCI}$, in number of slots for PUCCH transmissions, between a slot of a PDCCH MO for DCI format A and a slot of a corresponding PUCCH transmission.

In certain embodiments, the UE can also be provided with information for PUCCH resource, the PUCCH resource can be as described in REF5.

In certain embodiments, the information for determining a PUCCH TO, or a PUCCH resource, can be provided to the UE based on one of the following methods.

In a first method, any of the previous information can be provided to the UE by higher layers. For example, any of the information can be configured as common parameter of a serving cell by a SIB, such as a PUCCH resource prior to RRC connection that associated with PUCCH format 0 or PUCCH format 1 as described in REF3. For example, any of the previous information can be configured as a UE-specific parameter of a serving cell or as part of a DL BWP configuration through RRC signaling.

In a second method, any of the previous information can be included in DCI format A, and the UE accordingly determines PUCCH TO(s), or PUCCH resources for HARQ-ACK information, in response to DCI format A detection. When the UE does not detect a DCI format A within a time period, such as one or more corresponding PDCCH MOs, the UE does not transmit a PUCCH with HARQ-ACK information. In one example, the UE can be provided a set of multiple PUCCH resources by higher layers, and the DCI format A includes a field to select one of the multiple PUCCH resources. In another example, the UE can be provided multiple candidate values for the $k_{1,DCI}$ time offset by higher layers, and the DCI format A includes a field indicating one of the multiple candidate values.

In certain embodiments, a DCI format A can also indicate no adaptation to an existing configuration of communication parameters. When a UE does not detect the DCI format A at a corresponding PDCCH MO, any of the following UE behaviors for corresponding adaptation aspects can apply. In a first example, the UE can switch back to a default mode for the corresponding adaptation aspects. The default mode can be either configured by higher layers or defined in the specifications of the system operation. In a second example, the UE can keep a current behavior for the corresponding adaptation aspects, wherein the current behavior is determined based on cell-specific or UE-group-specific adaptation indicators in a last DCI format A that the UE successfully decoded.

When the UE detects (correctly decodes) the DCI format A, the UE can apply the adaptation indicators to corresponding adaptation aspects with an application delay relative to a reference point.

In certain embodiments, for determining the reference point in time to apply the adaptation indicators included in a DCI format A, one of the following methods can apply. In a first method, the reference point can be a last symbol or slot of a last PDCCH MO for detection of DCI format A over a time period. In a second method, the reference point can be a last symbol or slot of the PDCCH MO for detection of DCI format A when the UE successfully decodes the DCI format A. In a third method, the reference point can be a first symbol of a next PDCCH MO for detection of DCI format A when the UE successfully decodes the DCI format A. In a fourth method, the reference point can be a first symbol of the current period for PDCCH receptions, as determined by a corresponding search space set, when the UE successfully decodes the DCI format A. In a fifth method, the reference point can be a last symbol/slot of a PUCCH transmission occasion for HARQ-ACK information in response to a detection of DCI format A.

For determining the application delay for the adaptation indicators, one of the following two methods can apply. In a first method, the application delay is defined in the specifications of the system operation. For example, the application delay is 0 and the UE can apply the adaptation indicators immediately at the reference point. In a second method, the application delay can be configured by higher layers. For example, the unit of the application delay can be one symbol, one slot, one millisecond, or one second.

In a first approach for PDCCH based triggering for network adaptation using DCI format A, a UE can be provided a configuration of one or more SS set(s) for determining PDCCH MOs that include the DCI format A. The UE receives PDCCH candidates and performs decoding operations for detection of DCI format A in configured PDCCH MOs according to the configuration of the one or more SS set(s).

In certain embodiments, the UE can receive the configuration of the one or more SS set(s) based on one of the following three methods. In a first method, the configuration is provided to UEs by higher layers. For example, the configuration includes a single SS set that is provided by a SIB. In a second method, the SS set is same as another SS set, for example a Type0-PDCCH CSS set, a Type0A-PDCCH CSS set, or a Type3-PDCCH CSS set. In a third method, the configuration is defined in the specifications of the system operation.

A configuration of a SS set from a serving cell can be as described in REF3 and in REF5. A SS set can be either a CSS set or a USS set.

A configuration of a SS set for reception of PDCCH candidates associated with DCI format A in a serving cell can additionally include a number of $N_{MOs}$ PDCCH MOs) per PDCCH monitoring period, wherein each of the $N_{MOs}$ PDCCH MOs is associated with a QCL information/TCI state. The UE assumes that a same DCI format A is provided in each of the $N_{MOs}$ PDCCH MOs. To determine the QCL information/TCI states for the $N_{MOs}$ PDCCH MOs, one of the following three methods can be considered. In a first method, the $N_{MOs}$ PDCCH MOs are associated with N CORESETs CORESETs, where $N_{MOs} \geq N_{CORESETs}$. When $N_{MOs}=N_{CORESETs}$, the UE assumes there is one to one mapping between a PDCCH MO and an associated CORE-SET. The UE determines the QCL information for a PDCCH MO based on the QCL information/TCI state of the associated CORESET.

In a second method, a PDCCH MO has same QCL properties, such as QCL 'typeC' in FR1 or QCL 'typeD' in FR2, as described in REF4, with an SSB from an SSB burst in the serving cell. $N_{MOs}$ can be equal to the number of transmitted SSBs per SSB burst in the serving cell, so that there is one to one mapping between a PDCCH MO and transmitted SSB with respect to QCL information.

In a third method, a PDCCH MO is associated with a TCI state configured in the serving cell. The UE determines QCL type and QCL RS for a PDCCH MO according to the associated TCI state.

When a configuration of a SS set for reception of DCI format A is provided to the UE through RRC signaling, the UE can determine a PDCCH monitoring periodicity, different than the periodicity provided by the configuration of the SS set, for the detection of DCI format A based on $T_{NES\_DCI}$, wherein $T_{NES\_DCI}$ is a periodicity configured in SIB. The UE can ignore the periodicity of the SS set, when provided. Alternatively, the UE does not expect to receive a periodicity in the configuration of the SS set for the DCI format A. To determine a first slot for PDCCH MO(s) per period, the UE can determine an actual offset, $O_{NES}$, based on both $O_{NES\_DCI}$, and $O_{SS}$, such that $O_{NES}=O_{NES\_DCI}+O_{SS}$, wherein, for example, $O_{NES\_DCI}$ is an offset provided by a SIB, and $O_{SS}$ is an offset provided in the configuration of the SS set based on UE-specific RRC signaling.

In a second approach for a PDCCH based triggering for network adaptation using DCI format A, a UE can be provided a configuration of periodic or semi-persistent (p/sp) PDCCH resources for PDCCH receptions for detection of DCI format A. A UE can assume the serving cell always transmits a PDCCH candidate with DCI format A in a PDCCH MO for each PDCCH monitoring period.

In certain embodiments, the configuration for p/sp PDCCH resources can include any of the following information: (i) a PDCCH reception periodicity, (ii) an offset to determine start of PDCCH RO per period, (iii) a number of $N_{ROs} \geq 1$ PDCCH ROs per PDCCH reception period, wherein each of the $N_{ROs}$ PDCCH ROs has a QCL information. The UE assumes payload of the DCI format within the duration of $N_{ROs}$ PDCCH ROs are same, (iv) a number of $N \geq 1$ PDCCH candidates per control channel element (CCE) aggregation level to monitor. The CCE AL level can be fixed, for example, to be 16 only, (v) a number of $N_{CORESETs} \geq 1$ CORESETs.

To determine the QCL information for the $N_{ROs}$ PDCCH ROs per PDCCH reception period, one of the following three methods can be considered. In a first method, the $N_{ROs}$ PDCCH ROs are associated with $N_{CORESETs}$ CORESETs, where $N_{ROs} \geq N_{CORESETs}$. When $N_{ROs}=N_{CORESETs}$, the UE assumes there is one to one mapping between a PDCCH RO and an associated CORESET. The UE determines the QCL information for a PDCCH RO based on the QCL information of the associated CORSET.

In a second method, a PDCCH RO is QCLed with a SSB from a SSB burst in the serving cell. $N_{ROs}$ can be equal to the number of transmitted SSBs per SSB burst in the serving cell, so that there is one to one mapping between a PDCCH RO and transmitted SSB with respect to QCL information.

In a third method, a PDCCH RO is associated with a TCI state configured in the serving cell. The UE determines QCL type and QCL RS for a PDCCH RO according to the associated TCI state.

In certain embodiments, the UE can receive the configuration for p/sp PDCCH resources based on one of the following two methods. In a first method, the configuration is provided to UEs by higher layers; For example, the configuration is common to all UEs, and UE acquires the configuration together with configuration of the DCI format, e.g., NES-ConfigCommon, in SIB. In a second method, the configuration is defined in the specifications of the system operation.

The method 700, as illustrated in FIG. 7 describes an example of UE procedure for obtaining transmission/reception adaptation indicators provided by DCI format A in a PDCCH.

In an example for the first approach for obtaining transmission/reception adaptation indicators from a DCI format A, a UE is provided a configuration of a SS set to monitor PDCCH for detection of the DCI format A, (step 710). In step 720, the UE receives a PDCCH in a configured PDCCH MO and successfully decodes the DCI format A. In step 730, the UE then determines a number of adaptation indicators based on the DCI format A. In step 740, the UE applies the number of adaptation indicator(s) to corresponding transmission/reception aspects after an application delay relative to a reference point in time.

Although FIG. 7 illustrates the method 700 various changes may be made to FIG. 7. For example, while the method 700 is shown as a series of steps, various steps could overlap, occur in parallel, occur in a different order, or occur multiple times. In another example, steps may be omitted or replaced by other steps. For example, steps of the method 700 can be executed in a different order.

Embodiments of the present disclosure further describe PDSCH based signaling methods. This is described in the following examples and embodiments, such as those of FIGS. 8 and 9.

Figure 9:
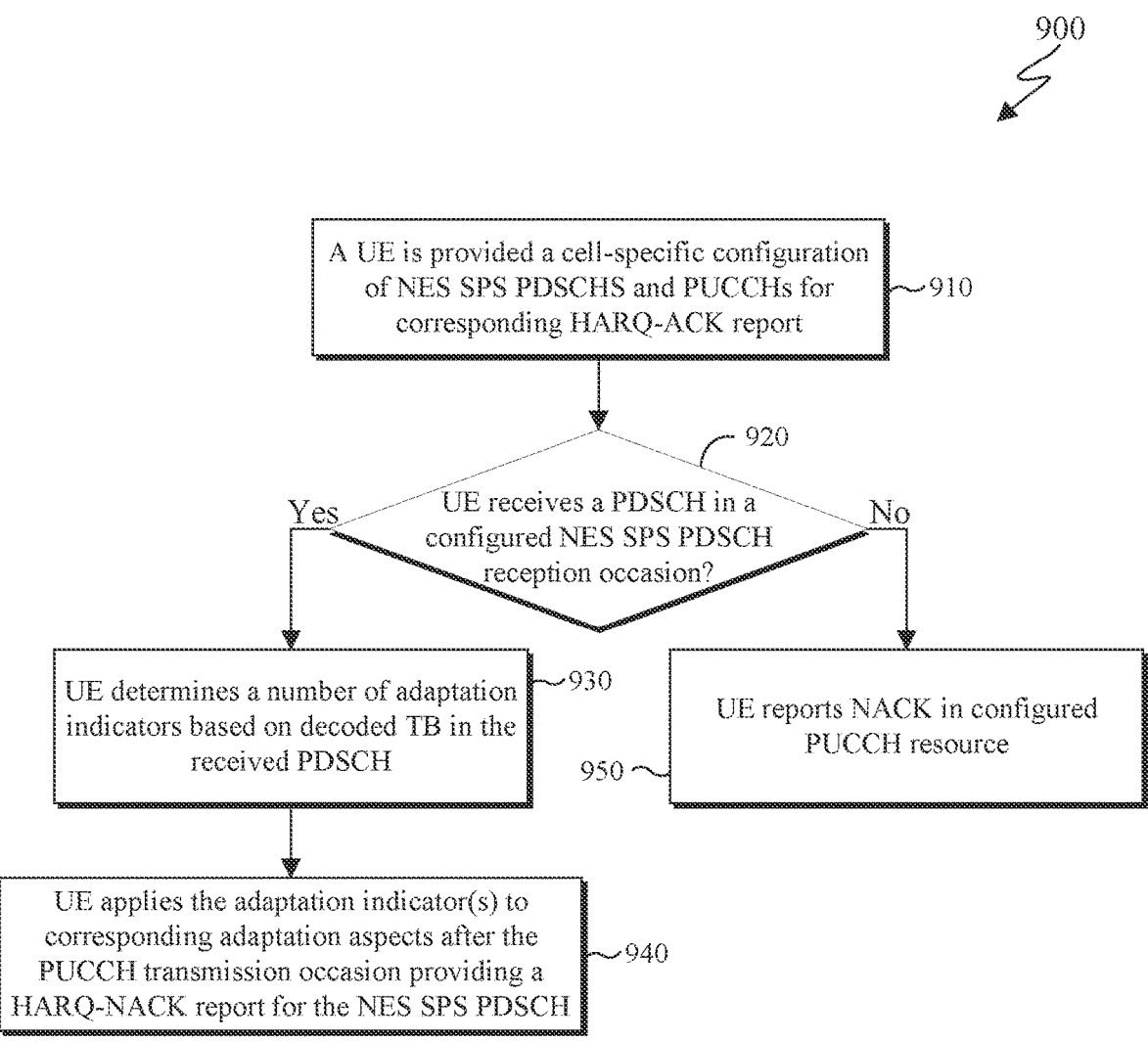
FIG. 9 illustrates an example method for obtaining transmission/reception adaptation indicators based on a second approach for a NES semi-persistently scheduled (SPS) PDSCH reception according to embodiments of the present disclosure.

FIG. 8 illustrates an example method 800 for obtaining transmission/reception adaptation indicators based on a first approach for a NES PDSCH according to embodiments of the present disclosure. FIG. 9 illustrates an example method 900 for obtaining transmission/reception adaptation indicators based on a second approach for a NES SPS PDSCH reception according to embodiments of the present disclosure. The steps of the method 800 of FIG. 8 and the steps of the method 900 of FIG. 9 can be performed by any of the UEs 111-116 of FIG. 1, such as the UE 116 of FIG. 3. The methods 800 and 900 are for illustration only and other embodiments can be used without departing from the scope of the present disclosure.

Embodiments of this disclosure also consider broadcast PDSCH based signaling method for providing one or more adaptation indicator(s), wherein the payload of the PDSCH includes a number of adaptation indicator(s). An adaptation indicator can be used to trigger any adaptation aspect as defined in Embodiment I of this disclosure. The message in terms of a number of adaptation indicators that is provided in the PDSCH is referred as c (NES) message, and the PDSCH is referred as NES PDSCH in this disclosure.

For determining the NES message carried by a NES PDSCH, a UE can be provided a configuration by higher layers, such as by a SIB or by UE-specific RRC signaling, for any of the following information when not defined in the specifications of the system operation: (i) a payload size; (ii) content and order of a number of cell-specific or UE-group-specific adaptation indicator(s); (iii) a scrambling ID used for a DM-RS of the NES PDSCH or for the NES PDSCH.

In a first approach for a PDSCH based signaling method for adaptation of transmission/reception parameters, a UE receives a NES PDSCH scheduled by a PDCCH in a CSS set that can be configured by a SIB or by UE-specific RRC signaling.

The method 800, as illustrated in FIG. 8, describes an example of UE procedure for obtaining transmission/reception adaptation indicators based on a first approach for a NES PDSCH.

In an example for a first approach of a NES PDSCH based signaling method, a UE (such as the UE 116) is a provided a configuration of a CSS set, for example in a SIB or by UE-specific RRC signaling (step 810). In step 820, the UE receives a PDCCH according to the CSS set, wherein the PDCCH provides a DCI format. In step 830, the UE successfully decodes the DCI format and a PDSCH scheduled by the DCI format. In step 840, the UE then determines a number of adaptation indicators based on the decoded PDSCH. In step 850, the UE applies the number of adaptation indicator(s) to corresponding adaptation aspects after an application delay relative to a reference point.

A DCI format that schedules a NES PDSCH can include fields to trigger a PUCCH transmission with HARQ-ACK information for a decoding outcome of a TB provided by the NES PDSCH. When a UE successfully decodes the DCI format, the UE transmits the PUCCH when the UE does not correctly decode the TB; otherwise, the UE does not transmit the PUCCH. The DCI format can include one or more of the following fields for the PUCCH transmission. For example, the DCI format can include a PDSCH-to-HARQ-_feedback timing indicator indicating a slot offset, with respect to slots for PUCCH transmissions, for a slot of the PUCCH transmission relative to the slot of the NES PDSCH reception. For another example, the DCI format can include a PUCCH resource indicator (PRI) field indicating a PUCCH resource from a set of one or more PUCCH resources. The one or more PUCCH resources can be provided to UE either in a SIB, or by RRC signaling, or can be defined in the specifications of the system operation.

In certain embodiments, a configuration of a CSS set from a serving cell can be as described REF3 and in REF5. The UE can receive the configuration of the CSS set based on one of the following three methods. In a first method, the configuration is provided to UEs by higher layers.

In a second method, the configuration can be determined based on the configuration for another CSS set, for example a Type0-PDCCH CSS set, or a Type0A-PDCCH CSS set.

In a third method, the configuration is defined in the specifications of the system operation.

In certain embodiments, for determining the reference point to apply adaptation indicators provided by a TB in a NES PDSCH, a UE can consider any of the following five methods. In a first method, the reference point can be a last symbol/slot of a last PDCCH MO in a PDCCH monitoring period.

In a second method, the reference point can be a last symbol or slot of a PUCCH for HARQ-ACK information for the TB provided by the NES PDSCH.

In a third method, the reference point can be a last symbol or slot of the NES PDSCH.

In a fourth method, the reference point can be a first symbol of a next period for PDCCH monitoring.

In a fifth method, the reference point can be a first symbol of the current PDCCH monitoring period.

In certain embodiments, for determining the application delay to apply adaptation indicators, one of the following two methods can apply. In a first method, the application delay can be defined in the specifications of the system operation. For example, the application delay is 0 and the UE can apply the adaptation indicators immediately at the reference point.

In a second method, the application delay can be configured by higher layers. The unit of the application delay can be one symbol, one slot, one millisecond, or one second.

In a second approach for PDSCH based signaling method, a UE can be provided a configuration of SPS PDSCHs for the reception of a NES message.

The method 900, as illustrated in FIG. 9 describes an example of UE procedure for obtaining transmission/reception adaptation indicators based on a second approach for a NES SPS PDSCH reception according to the disclosure.

In step 910, a UE (such as the UE 116) is a provided a cell-specific or UE-group-specific configuration for NES SPS PDSCH receptions, and a PUCCH resource for a PUCCH transmission with a corresponding HARQ-ACK report. In step 920 the UE determines whether or not the UE successfully decodes a TB provided by a NES SPS PDSCH in a configured NES SPS PDCCH reception occasion per period. When the UE successfully decodes the TB (as determined in step 920), the UE in step 930 determines a number of adaptation indicators. The UE then applies the number of adaptation indicator(s) to corresponding adaptation aspects after the PUCCH transmission occasion providing a HARQ-ACK report with ACK value for the NES SPS PDSCH (step 940). When the UE incorrectly decodes the TB (as determined in step 920), the UE in step 950 reports NACK in the PUCCH transmission. A PUCCH resource for the PUCCH transmission can be provided in advance by higher layers or, in case the PUCCH transmission is only for indicating an ACK value, can be indicated by the NES SPS PDSCH, for example through a MAC CE.

In certain embodiments, the cell-specific or UE-group-specific configuration of NES SPS PDSCH and a corresponding PUCCH resource for HARQ-ACK report can include any of the following information. For example, the information can include a periodicity for NES SPS PDSCH.

For another example, the information can include a number of $N_{TCIs} \geq 1$ associated TCI state(s). A number of $N_{ROs}$ NES SPS PDSCH reception occasions (ROs) can be configured per period, wherein each of the $N_{ROs}$ NES SPS PDSCH ROs is associated with one of the $N_{TCIS}$ TCI state(s), and $N_{ROs} \geq N_{TCIS}$ For another example, the information can include a duration of a number of slots or NES SPS PDSCH ROs per period. The NES SPS PDSCHs within a duration can be repetitions with a same TB.

For another example, the information can include frequency domain resource assignment for the NES SPS PDSCH, such as a number of allocated RBs, or the first RB.

For another example, the information can include time domain resource assignment for the NES SPS PDSCH, such as the start symbol or symbol duration for the PDSCH.

For another example, the information can include redundancy version. For example, it can be fixed as RVO.

For another example, the information can include PUCCH resource indicator to indicate multiple PUCCH resources defined in the specifications of the system operations or a PUCCH resource.

For yet another example, the information can include PDSCH-to-HARQ_feedback timing indicator.

In certain embodiments, the UE can receive the configuration through one of the following two methods. In a first method, the configuration is provided to UEs by higher layers. In a second method, the configuration is defined in the specifications of the system operation.

Although FIG. 8 illustrates the method 800 and FIG. 9 illustrates the method 900 various changes may be made to FIGS. 8 and 9. For example, while the methods 800 and 900 are shown as a series of steps, various steps could overlap, occur in parallel, occur in a different order, or occur multiple times. In another example, steps may be omitted or replaced by other steps. For example, steps of the method 800 and the method 900 can be executed in a different order.

Embodiments of the present disclosure also describe a combination of PDCCH and PDSCH based signaling method. This is described in the following examples and embodiments, such as those of FIG. 10.

Figure 10:
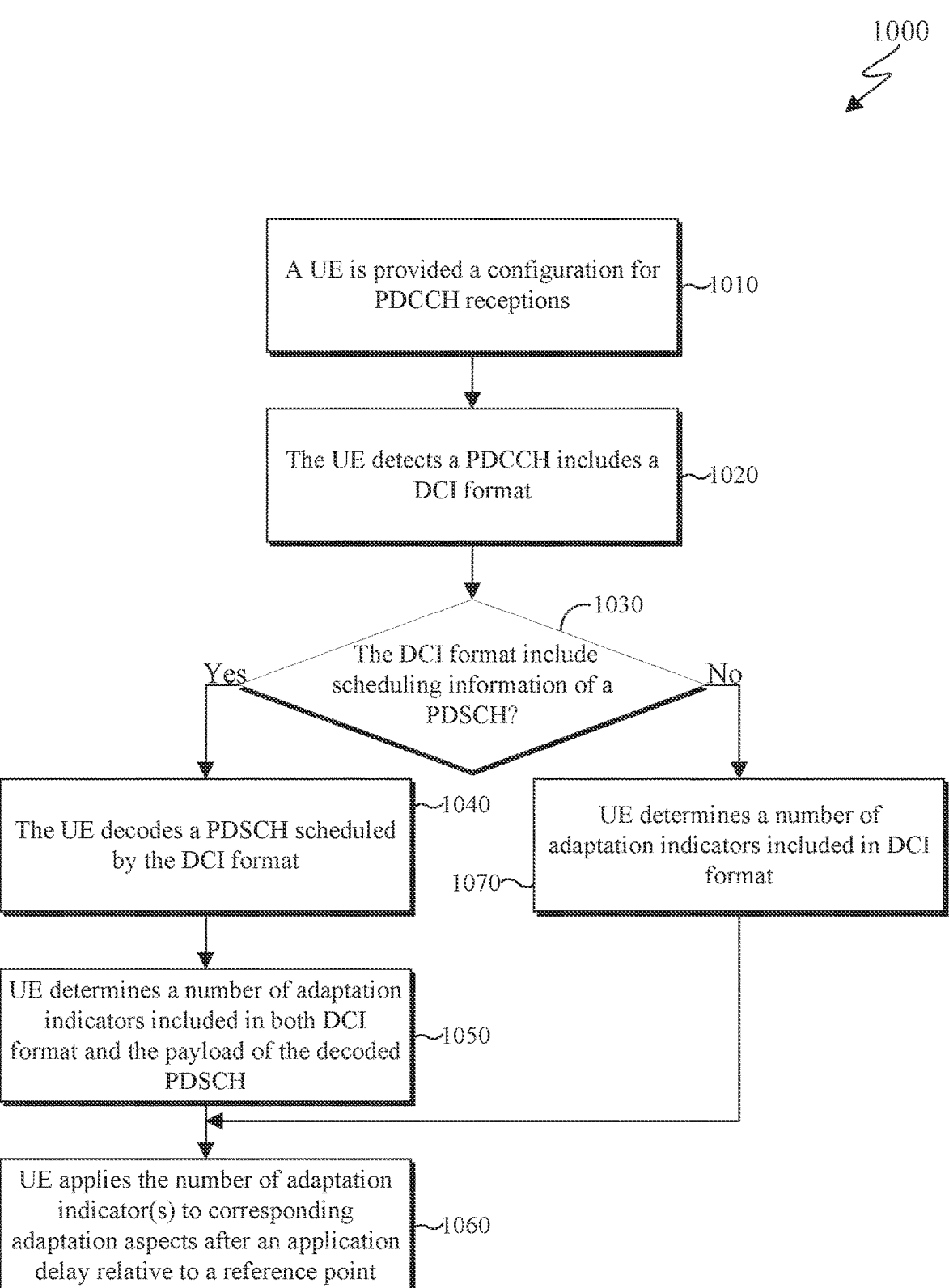
FIG. 10 illustrates an example method for obtaining transmission/reception adaptation indicators based on a combination of information provided by a DCI format scheduling a PDSCH and by a Transport Block (TB) in the PDSCH according to embodiments of the present disclosure.

FIG. 10 illustrates an example method for obtaining transmission/reception adaptation indicators based on a combination of information provided by a DCI format scheduling a PDSCH and by a TB in the PDSCH according to embodiments of the present disclosure. The steps of the method 1000 of FIG. 10 can be performed by any of the UEs 111-116 of FIG. 1, such as the UE 116 of FIG. 3. The method 1000 is for illustration only and other embodiments can be used without departing from the scope of the present disclosure.

Certain embodiments of the present disclosure also consider a combination of PDCCH and PDSCH based signaling method for providing one or more adaptation indicator(s), wherein a number of adaptation indicator(s) are provided by a DCI format in a PDCCH and by a TB, such as in a MAC CE, in a PDSCH scheduled by the DCI format.

The method 1000, as illustrated in FIG. 10, describes an example of UE procedure for obtaining transmission/reception adaptation indicators based on a combination of information provided by a DCI format scheduling a PDSCH and by a TB in the PDSCH.

In an example for a combination of PDCCH and PDSCH based signaling, a UE (such as the UE 116) is a provided a configuration for PDCCH receptions, such as corresponding search space sets (step 1010). In step 1020, the UE detects a PDCCH that includes a DCI format in a PDCCH MO according to the configuration. In step 1030, the UE then determines whether or not the DCI format includes scheduling information for a PDSCH, for example based on a 1-bit field in the DCI format. If the DCI format schedules a PDSCH (as determined in step 1030), the UE in step 1040 decodes a PDSCH based on the scheduling information provided by the DCI format. In step 1050, the UE then determines a number of adaptation indicators provided by the DCI format, when any, and by a TB in the PDSCH. In step 1060, the UE applies the number of adaptation indicator(s) to corresponding adaptation aspects after an application delay relative to a reference point.

If the DCI format does not schedule a PDSCH (as determined in step 1030), the UE in step 1070 then determines a number of adaptation indicators included in the decoded DCI format. The UE then applies the number of adaptation indicator(s) to corresponding adaptation aspects after an application delay relative to a reference point (step 1060).

In certain embodiments, for determining the DCI format, a UE can be provided, for example by a SIB or by UE-specific RRC signaling, a configuration that indicates any of the following information, when not provided by the specifications of the system operation. For example, the information can include payload size. For instance, it can be same as DCI format 1_0 provided by PDCCH according to a CSS set. For another instance, the payload size can be fixed, such as to 40 bits including CRC.

For another example, the information can include content and order of a number of adaptation indicator(s).

For another example, the information can include NES RNTI. For instance, the NES RNTI can be fixed and defined in the specifications of the system operation. In another example, the NES RNTI can be configured by higher layers. For another instance, the NES RNTI can be determined from the cell ID of the serving cell.

For another example, the information can include a location of a field to indicate whether or not the DCI format includes scheduling information for a PDSCH.

For yet another example, the information can include a number of fields to indicate scheduling information for a PDSCH, when applicable. A field can be any of the following: (i) frequency domain resource assignment, such as a number of allocated RBs, or the first RB; (ii) time domain resource assignment, such as a first symbol or number of symbols; (iii) redundancy version, for example it can be fixed as RVO; (iv) PUCCH resource indicator to indicate multiple PUCCH resources defined in the specifications of the system operations or a PUCCH resource; (v) PDSCH-to-HARQjeedback timing indicator.

In certain embodiments, the UE can transmit a PUCCH with HARQ-ACK information associated with a PDCCH, or with a PDSCH scheduled by the DCI format. For determining a PUCCH resource for the PUCCH transmission, a method described with respect to FIGS. 7-9 can apply.

In a first method for determining the reference point, the reference point can be determined based on the PDCCH monitoring/reception occasion. Any method described with respect to FIGS. 7-9 can be considered.

In a second method for determining the reference point, the reference point can be determined based on a PDSCH reception occasion. Any method described with respect to FIGS. 8 and 9 can be considered.

In a third method for determining the reference point, the reference point can be determined based on a PUCCH transmission of HARQ-ACK feedback for a PDCCH or for a PDSCH scheduled by the DCI format. Any method described with respect to FIGS. 7-9 can be considered.

Although FIG. 10 illustrates the method 1000 various changes may be made to FIG. 10. For example, while the method 1000 is shown as a series of steps, various steps could overlap, occur in parallel, occur in a different order, or occur multiple times. In another example, steps may be omitted or replaced by other steps. For example, steps of the method 1000 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system supporting network energy saving, the UE comprising:
a transceiver; and
a processor configured to:
receive, via the transceiver from a base station, configuration information for a cell operation including a cell discontinuous reception (DRX) operation,
receive, via the transceiver from the base station, downlink control information (DCI) with a cyclic redundancy check (CRC) scrambled by a specific radio network temporary identifier (RNTI) associated with the cell operation, the DCI including one or more indicators indicating whether to activate the cell operation for one or more serving cells, and
identify that the cell operation is activated or deactivated based on the one or more indicators indicating an activation or deactivation of the cell operation.

2. The UE of claim 1, wherein the processor is configured to monitor a physical downlink control channel (PDCCH) for detection of the DCI including the one or more indicators indicating whether to activate the cell operation for the one or more serving cells on a common search space.

3. The UE of claim 1, wherein the UE does not transmit data on a configured grant (CG) resource during a non-active duration in case that the UE is configured with the cell DRX operation and the cell DRX operation is activated for the one or more serving cells.

4. The UE of claim 1, wherein:
the cell operation further comprises an operation of which the base station does not transmit data in the one or more serving cells during a non-active duration, and
the UE does not monitor a PDCCH during the non-active duration in case that the UE is configured with the cell operation and the cell operation is activated for the one or more serving cells.

5. The UE of claim 1, wherein the cell operation is configured with a UE group.

6. The UE of claim 1, wherein the processor is further configured to identify that the cell operation is activated or deactivated based on each bit value of the one or more indicators.

7. A method performed by a user equipment (UE) in a wireless communication system supporting network energy saving, the method comprising:
receiving, from a base station, configuration information for a cell operation including a cell discontinuous reception (DRX) operation;
receiving, from the base station, downlink control information (DCI) with a cyclic redundancy check (CRC) scrambled by a specific radio network temporary identifier (RNTI) associated with the cell operation, the DCI including one or more indicators indicating whether to activate the cell operation for one or more serving cells; and
identifying that the cell operation is activated or deactivated based on the one or more indicators indicating activation or deactivation of the cell operation.

8. The method of claim 7, further comprising monitoring a physical downlink control channel (PDCCH) for detection of the DCI including the one or more indicators indicating whether to activate the cell operation for the one or more serving cells on a common search space.

9. The method of claim 7, wherein the UE does not transmit data on a configured grant (CG) resource during a non-active duration in case that the UE is configured with the cell DRX operation and the cell DRX operation is activated for the one or more serving cells.

10. The method of claim 7, wherein:
the cell operation further comprises an operation of which the base station does not transmit data in the one or more serving cells during a non-active duration, and
the UE does not monitor a PDCCH during the non-active duration in case that the UE is configured with the cell operation and the cell operation is activated for the one or more serving cells.

11. The method of claim 7, wherein the cell operation is configured with a UE group.

12. The method of claim 7, wherein identifying that the cell operation is activated or deactivated comprises identifying that the cell operation is activated or deactivated based on each bit value of the one or more indicators.

13. A base station in a wireless communication system supporting network energy saving, the base station comprising:
a transceiver; and
a processor configured to:
transmit, to a user equipment (UE) via the transceiver, configuration information for a cell operation including a cell discontinuous reception (DRX) operation,
transmit, to a UE via the transceiver, downlink control information (DCI) with a cyclic redundancy check (CRC) scrambled by a specific radio network temporary identifier (RNTI) associated with the cell operation, the DCI including one or more indicators indicating whether to activate the cell operation for one or more serving cells, and
perform activation or deactivation of the cell operation based on the one or more indicators indicating an activation or deactivation of the cell operation.

14. The base station of claim 13, wherein the transceiver is configured to transmit, through a physical downlink control channel (PDCCH) on a common search space, the DCI including the one or more indicators indicating whether to activate the cell operation for the one or more serving cells.

15. The base station of claim 13, wherein the base station does not receive, from the UE, data on a configured grant (CG) resource during a non-active duration in case that the UE is configured with the cell DRX operation and the cell DRX operation is activated for the one or more serving cells.

16. The base station of claim 13, wherein:
the cell operation further comprises an operation of which the base station does not transmit data in the one or more serving cells during a non-active duration, and
the base station does not transmit, to the UE, a PDCCH during the non-active duration in case that the UE is configured with the cell operation and the cell operation is activated for the one or more serving cells.

17. The base station of claim 13, wherein the cell operation is configured with a UE group.

18. The base station of claim 13, wherein processor is further configured to perform the activation or the deactivation of the cell operation based on each bit value of the one or more indicators.

* * * * *